United States Patent
He et al.

(10) Patent No.: US 9,992,296 B2
(45) Date of Patent: Jun. 5, 2018

(54) CACHING OBJECTS IDENTIFIED BY DYNAMIC RESOURCE IDENTIFIERS

(71) Applicant: Juniper Networks, Inc., Sunnyvale, CA (US)

(72) Inventors: Junxiao He, Saratoga, CA (US); Navaneeth Krishnan Ramaswamy, Chennai (IN); Jaspal Kohli, Sunnyvale, CA (US); Kumar Narayanan, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days. days.

(21) Appl. No.: 15/225,430

(22) Filed: Aug. 1, 2016

(65) Prior Publication Data

US 2016/0344835 A1    Nov. 24, 2016

Related U.S. Application Data

(63) Continuation of application No. 13/841,987, filed on Mar. 15, 2013, now Pat. No. 9,407,726.

(51) Int. Cl.
*H04L 29/08* (2006.01)
*H04L 29/12* (2006.01)

(52) U.S. Cl.
CPC ...... *H04L 67/2842* (2013.01); *H04L 61/2015* (2013.01); *H04L 67/06* (2013.01); *H04L 67/141* (2013.01)

(58) Field of Classification Search
CPC .............. H04L 67/2842; H04L 67/141; H04L 61/2015; H04L 67/06
See application file for complete search history.

(56) References Cited

U.S. PATENT DOCUMENTS

| | | | | |
|---|---|---|---|---|
| 7,096,418 | B1 * | 8/2006 | Singhal | G06F 17/30902 707/E17.12 |
| 7,162,539 | B2 * | 1/2007 | Garcie-Luna-Aceves | G06F 12/1483 707/E17.12 |
| 9,407,726 | B1 | 8/2016 | He et al. | |
| 2003/0204529 | A1 | 10/2003 | Hertling et al. | |
| 2006/0167969 | A1 * | 7/2006 | Andreev | H04L 67/2819 709/202 |
| 2008/0310365 | A1 | 12/2008 | Ergen et al. | |
| 2011/0137888 | A1 * | 6/2011 | Yoo | G06F 17/30902 707/713 |
| 2012/0030212 | A1 * | 2/2012 | Koopmans | H04N 7/17318 707/741 |
| 2012/0191804 | A1 * | 7/2012 | Wright | G06F 17/30902 709/217 |
| 2012/0233284 | A1 | 9/2012 | Arolovitch et al. | |

* cited by examiner

*Primary Examiner* — Cheikh Ndiaye
(74) *Attorney, Agent, or Firm* — Harrity & Harrity, LLP

(57) ABSTRACT

A first server may receive, from a client device, an indication of a request for a content file via a network address; identify that the network address is a dynamic network address; establish a communication session with a second; receive a portion of the content file from the second server; determine an index parameter based on receiving the portion of the content file; determine whether the content file is being stored by the first server based on a cache index and based on the index parameter or based on information associated with the request for the content file; receive a remaining portion of the content file based on determining that the content file is not being stored by the first server; and provide the content file to the client device.

20 Claims, 8 Drawing Sheets

| Origin device domain 410 | Content file Info 420 | Sample Size 430 | Checksum value 440 | Signature 450 |
|---|---|---|---|---|
| yourmovie.com | 20 MB video | 100kb | 89039074903 | UFBCH248 |
| myclips.com | 3 MB image | 10kb | 82972408974 | FJHS97CJS |
| funvids.com | 7 MB audio | 20kb | 89047980347 | N/A |
| shareflix.com | 1.5 GB video | 700kb | 23828948597 | 8270FUC9 |

CACHING OBJECTS IDENTIFIED BY DYNAMIC RESOURCE IDENTIFIERS

RELATED APPLICATION

This application is a continuation of U.S. patent application Ser. No. 13/841,987, filed Mar. 15, 2013 (now U.S. Pat. No. 9,407,726), which is incorporated herein by reference.

BACKGROUND

A service provider is an entity (e.g., a business or an organization) that sells bandwidth provided by a network (e.g., the Internet, a data network, a telecommunication network, etc.) associated with the service provider. Service providers may include telecommunications companies, data carriers, wireless communications providers, Internet service providers, cable television operators offering high-speed Internet access, etc. The rapid growth in the use of content, such as, for example, video, audio, images, and software downloads, is creating much higher bandwidth demands on service providers, with sharp bandwidth peaks that may be due to suddenly popular content or the occurrence of certain events.

In order to address such higher bandwidth demands, service providers deploy proxy cache devices, such as, cache servers, in their networks. The cache servers can cache popular content, which enables the service providers to optimize network utilization and to save on backhaul bandwidth costs. The cache servers may be associated with network devices (e.g., routers) that interconnect client devices requesting content (e.g., via a universal resource identifier, such as a web link) and origin devices storing the requested content.

If a request is for content that is stored in the cache server, then the cache server provides the content to the client device. If the requested content is not stored in the cache server, then the cache server connects to the origin device and requests the content from the origin device. The cache server provides the content received from the origin device to the client device, and may cache the content for future use.

SUMMARY OF THE INVENTION

According to one example implementation, a method may include receiving, by a first server and from a client device, an indication for a request for a content file via a network address; identifying, by the first server, that the network address is a dynamic network address; and establishing, by the first server, a communication session with a second server. The second server may store the content file. The method may also include receiving, by the first server, a portion of the content file from the second server based on establishing the communication session with the second server, and determining, by the first server, an index parameter based on receiving the portion of the content file. The index parameter may identify the content file. The method may further include determining, by the first server, whether the content file is being stored by the first server based on a cache index and based on the index parameter; terminating, by the first server, the communication session with the second server based on determining that content file is being stored by the first server; receiving, by the first server, a remaining portion of the content file based on determining that the content file is not being stored by the first server; and providing, by the first server, the content file to the client device based on determining that the content file is being stored by the first server or based on receiving the remaining portion of the content file.

According to another example implementation, a first server may receive, from a client device, an indication of a request for a content file via a network address; identify that the network address is a dynamic network address; and establish a communication session with a second server. The second server may store the content file. The first server may also receive a portion of the content file from the second server based on establishing the communication session with the second server and determine an index parameter based on receiving the portion of the content file. The index parameter may identify the content file. The first server may also determine whether the content file is being stored by the first server based on a cache index and based on the index parameter; receive a remaining portion of the content file based on determining that the content file is not being stored by the first server; and provide the content file to the client device based on determining that the content file is being stored by the first server or based on receiving the remaining portion of the content file.

According to another example implementation, a computer-readable medium for storing instructions, may include instructions having: multiple instructions which, when executed by one or more processors associated with a first server, cause the one or more processors to receive, from a client device, an indication of a request for a content file via a network address; identify that the network address is a dynamic network address; and establish a communication session with a second server. The second server may store the content file. The multiple instructions may further cause the one or more processors to receive a portion of the content file from the second server based on establishing the communication session with the second server and determine an index parameter based on receiving the portion of the content file. The index parameter may identify the content file. The multiple instructions may further cause the one or more processors to determine whether the content file is being stored by the first server based on a cache index and based on the index parameter; receive a remaining portion of the content file based on determining that the content file is not being stored by the first server; store the index parameter in the cache index based on determining that the content file is not being stored by the first server; and provide the content file to the client device based on determining that the content file is being stored by the first server or based on receiving the remaining portion of the content file.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may cache a content file (e.g., a video file, an audio file, an image file, a text file, an application file, or some other computer file) that is stored by an origin device and is identified via a dynamic network address (e.g., a dynamic universal resource identifier (URI), a dynamic internet protocol (IP) address, and/or some other type of dynamic network address) in a manner that prevents multiple copies of a particular content file from being cached. For example, a URI may be generated by an origin device, storing a content file, when a client device requests the content file (e.g., via a link on a web page). Another URI may be generated by the origin device when another client device requests the same content file. Thus, multiple different URIs may correspond to a particular content file. As a result, the cache server may store multiple copies of the particular content file when indexing content based on URIs, thereby consuming storage space on the cache server.

While the systems and/or methods are described caching a content file that is identified based on a dynamic URI, in practice, the systems and/or methods may cache a content file that is identified based on some other type of dynamic network address.

Figure 1:
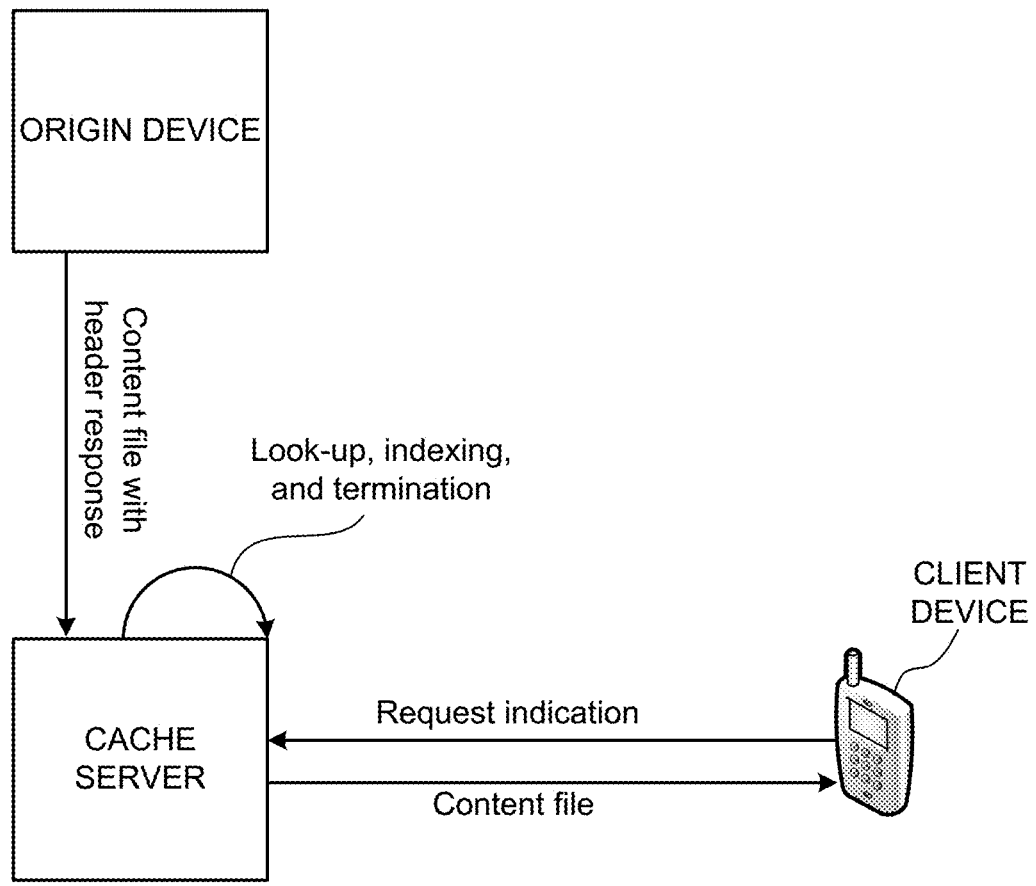
FIG. 1 illustrates an example overview of an implementation described herein.

FIG. 1 illustrates an example overview of an implementation described herein. In FIG. 1, assume that a cache server stores content, originated from an origin device, and delivers the content to a client device. Further, assume that the client device requests a content file that is stored by the origin device. Further, assume that the content file request includes a dynamic URI to identify the content file.

As shown in FIG. 1, a cache server may receive an indication that the client device requests the content file using the URI. In some implementations, the cache server may determine that the URI, used to request the content file, is a dynamic URI (e.g., based on a format of the URI, a session ID included in the URI, a hash code included in the URI, etc.).

In some implementations, the cache server may communicate with the origin device (e.g., by establishing a communication session with the origin device) to receive the content file on behalf of the client device. As shown in FIG. 1, the cache server may receive a portion of the content file having one or more response values that uniquely identify the content file, such as metadata associated with the content file (e.g., a last modified data and/or time, a content length value, etc.) a signature (e.g., an entity tag (etag)), a checksum value, and/or some other information that uniquely identifies the content file. In some implementations, the cache server may look up the one or more response values in a cache index to identify whether content file is being stored by the cache server. For example, the cache server may determine that the cache server stores the content file (e.g., a cache hit) when the cache index identifies the one or more response values and the corresponding content file. In some implementations, the cache index may map a request value (e.g., a static portion of the URI, a request header, and/or some other request value) to a content file in addition to or in place of mapping a response value to the content file.

If the cache server stores the content file, then the cache server may terminate the communication session with the origin device and deliver the content file to the client device. If the cache server does not store the content file (e.g., a cache miss), then the cache server may receive the remainder of the content file, store the content file, update the cache index (e.g., by generating an association between the content file and the one more response values), and provide the content file to the client device.

In some other implementations, the cache server may receive a portion of the content file and may generate a checksum value based on the portion of the content file. In some implementations, the cache server may look up the checksum value to determine a cache hit or a cache miss based on the checksum value. For example, the cache server may determine a cache hit when the cache index stores the checksum value and a corresponding content file.

As a result, the cache server may prevent caching multiple instances of a particular content file associated with a dynamic URI. Further, network traffic may be reduced since the cache server receives a portion of the content file to identify a cache index parameter (e.g., an etag, a checksum value, a response header, elements of metadata, and/or some other parameter) that uniquely identifies a content file and is used to identify a cache hit or a cache miss. Additionally, because the checksum value is based on data associated with the content file, the cache server may prevent caching multiple instances of the particular content file when the particular content file is stored by multiple origin devices.

Figure 2:
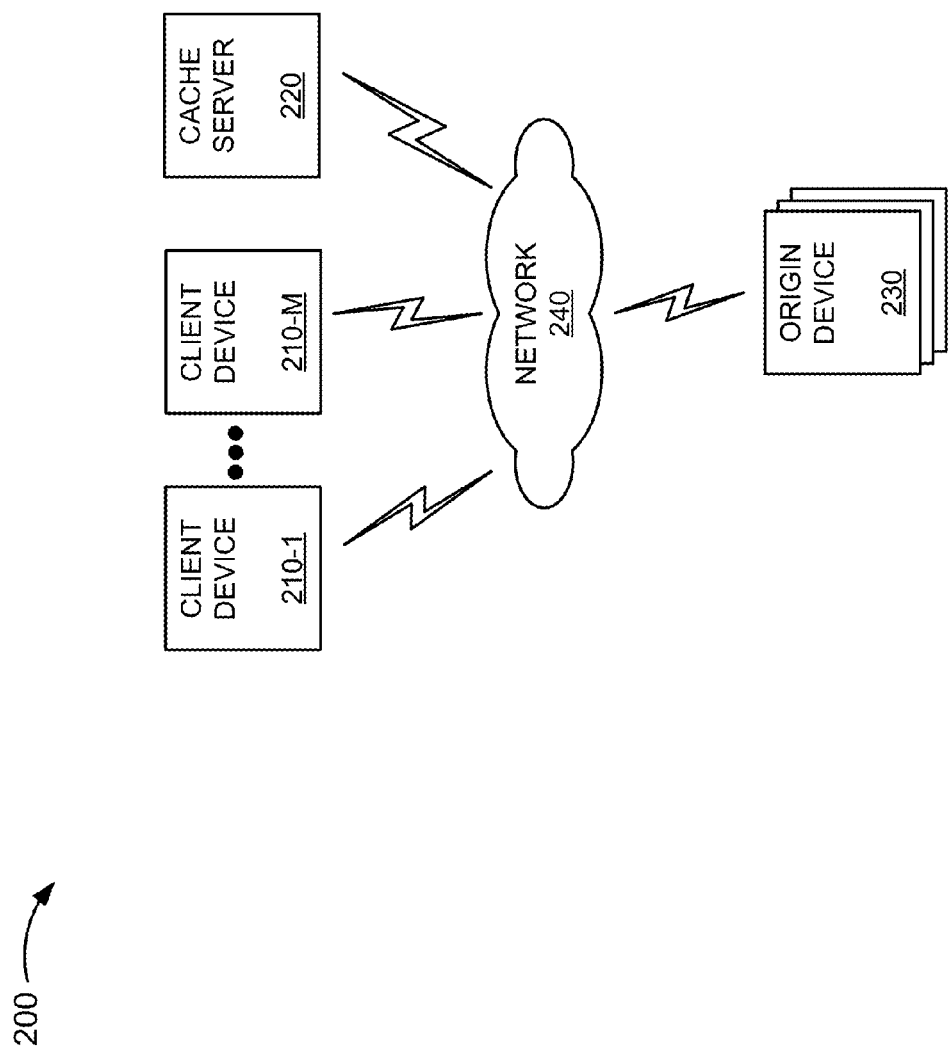
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include client devices 210-1, . . . , 210-M (where M≥1), cache server 220, origin device 230, and network 240.

Client device 210 may include any device capable of communicating via a network, such as network 240. For example, client device 210 may correspond to a mobile communication device (e.g., a smart phone or a personal digital assistant (PDA)), a portable computer device (e.g., a laptop or a tablet computer), a gaming device, a set-top box, a desktop computing device, etc. In some implementations, client device 210 may communicate with origin device 230 (e.g., via cache server 220) to request and receive a content file.

Cache server 220 may include one or more computing devices, such as a server device or a collection of server devices. In some implementations, cache server 220 may receive a content file from origin device 230, store the content file, and maintain a cache index to identify the stored content file for delivery to client device 210 (e.g., on behalf of origin device 230). Additionally, or alternatively, cache server 220 may direct origin device 230 to provide a content file to client device 210 (e.g., when client device 210 requests the content file and the content file is not stored by cache server 220). In some implementations, cache server 220 may generate a checksum value based on data associated with a content file and may store the checksum value for a corresponding content file in the cache index.

Origin device 230 may include one or more computing devices, such as a server device or a collection of server devices. In one example implementation, origin device 230 may include content files that may be accessed by client device 210 via network 240. Additionally, or alternatively, origin device 230 may provide particular content files to cache server 220 for storage. Cache server 220 may store the particular content files so that cache server 220 may provide the particular content files to client device 210, when requested by client device 210, and without involving origin device 230. In some implementations, origin device 230 may identify a content file based on a dynamic type URI. In some implementations, the content file may include a signature, such as an entity tag (etag) including information that uniquely identifies the content file, a last modified data and/or time, a content length value, a response header, elements of metadata, and/or some other information that uniquely identifies the content file.

Network 240 may include one or more wired and/or wireless networks. For example, network 240 may include a cellular network, a public land mobile network (PLMN), a second generation (2G) network, a third generation (3G) network, a fourth generation (4G) network, a fifth generation (5G) network, and/or another network. Additionally, or alternatively, network 240 may include a local area network (LAN), a wireless LAN (WLAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
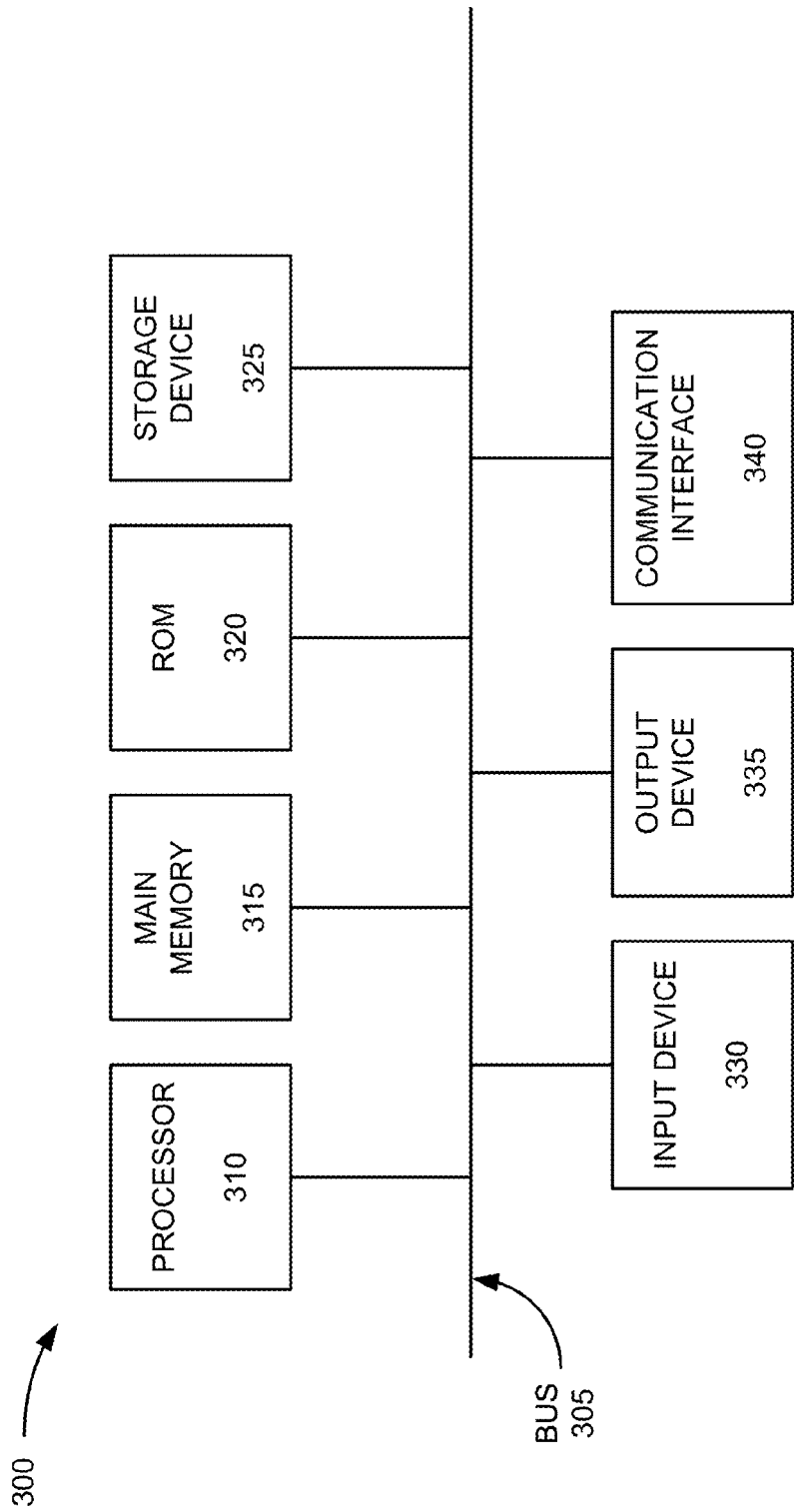
FIG. 3 illustrates example components of a device that may be used within the environment of FIG. 2.

FIG. 3 illustrates example components of a device 300 that may be used within environment 200 of FIG. 2. Device 300 may correspond to client device 210, cache server 220, or origin device 230. Each of client device 210, cache server 220, or origin device 230 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like mechanism that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
FIG. 4 illustrates an example data structure that may be stored by one or more devices in the environment of FIG. 2.

FIG. 4 illustrates an example data structure 400 that may be stored by one or more devices in environment 200, such as cache server 220. In some implementations, data structure 400 may be stored in a memory of cache server 220. In some implementations, data structure 400 may be stored in a memory separate from, but accessible by, cache server 220. In some implementations, data structure 400 may be stored by some other device in environment 200, such as origin device 230 or client device 210.

A particular instance of data structure 400 may contain different information and/or fields than another instance of data structure 400. In some implementations, data structure 400 may correspond to information associated with a cache index to identify content files stored by cache server 220. Data structure 400 may store a cache index for content files associated with dynamic URIs. Each entry of data structure 400 may store information to identify a content file being stored by cache server 220. In some implementations, the cache index may map a content file to a response value and/or a request value. In some implementations, cache server 220 may store another cache index to identify content files associated with static URIs.

As shown in FIG. 4, data structure 400 may include origin device domain field 410, content file information field 420, sample size field 430, checksum value field 440, and signature field 450.

Origin device domain field 410 may store information to identify a domain of a particular origin device 230 from which a particular content file originated (e.g., the particular origin device 230 with which cache server 220 communicated to receive the particular content file). In some implementations, information stored by origin device domain field 410 may be based on a request value, such as a portion of a URI used to access the particular content file (e.g., a portion of the URI that identifies the domain of origin device 230).

Content file information field 420 may store information that identifies attributes associated with a content file stored by cache server 220. For example, content file information field 420 may store a size of the content file, a type of the content file (e.g., a video content file, an image content file, an audio content file, etc.). or some other information to identify attributes of the content file, such as a length of the content file, a title of the content file, a description of the content file, a format of the content file, or the like. In some implementations, the attributes of the content file may be determined when cache server 220 requests the content file from origin device 230. For example, the attributes of the content file may be included in a header portion of the content file and/or may be determined based on a file extension of the content file (e.g., a "jpg" file extension may identify an image type content file, an "mp3" file extension may identify an audio file, an "mpeg" file extension may identify a video file, etc.).

Sample size field 430 may store information to identify a size of a sample portion of the content file used by origin device 230 to determine a checksum value, an etag, a response header, elements of metadata, and/or some other cache index parameter. In some implementations, the sample size may be based on a total size of the content file. For example, the sample size may be 1%, 2%, 5%, or some other portion of the total size of the content file. In some implementations, different sample size portions of the same content file may correspond to different checksum values.

In some implementations, the sample size may be proportional to the reliability of the checksum value. As an example, assume that the sample size for two different content files is 5 kilobytes (kb). Further, assume that origin device 230 determines an identical checksum value based on the sample portion (e.g., a checksum value of 12345). That is, origin device 230 may not be able to distinguish between the two different content files based on the checksum value. In another example, assume that that sample size for the two different content files is 10 kb. Further, assume that origin device 230 determines different checksum values based on the sample portion (e.g., a checksum value of 123456 for one of the content files and a checksum value of 123457 for the other content file). That is, the likelihood that origin device 230 may identify a content file based on the checksum value may increase proportional to the sample size. Thus, the sample size may be determined based on a trade-off decision between reliability of a corresponding checksum value versus network traffic (e.g., since network traffic is proportional to sample size).

Checksum value field 440 may store information that identifies a checksum value associated with a particular content file. For example, checksum value field 440 may store the checksum value when cache server 220 receives a portion of a content file and determines the checksum value based on data associated with the received portion of the content file. In some implementations, cache server 220 may use a checksum algorithm (e.g., a message-digest series 5 algorithm (MD5) or some other checksum algorithm) to determine the checksum value.

Signature field 450 may store information that identifies a signature, such as an etag that uniquely identifies a content file. In some implementations, the etag may be received by cache server 220 from origin device 230 when cache server 220 receives a portion of the content file. For example, the etag may include a string of characters in a response header of the portion of the content file to uniquely identify the content file. In some implementations, cache server 220 may not receive an etag (e.g., when origin device 230 does not include an etag in the portion of the content file). In this case, signature field 450 may store "N/A" or some other indication that an etag is not available. In some implementations, signature field 450 may store some other information to uniquely identify a content file, such as a date and time in which the content file was created or modified, a length of the content file, etc.

While particular fields are shown in a particular format in data structure 400, in practice, data structure 400 may include additional fields, fewer fields, different fields, or differently arranged fields than are shown in FIG. 4. For example, data structure 400 may store some other information to uniquely identify a content file stored by cache server 220, such as a response header, elements of metadata, and. In some implementations, the format of the information stored by data structure 400 may vary from what is shown in FIG. 4.

Figure 5:
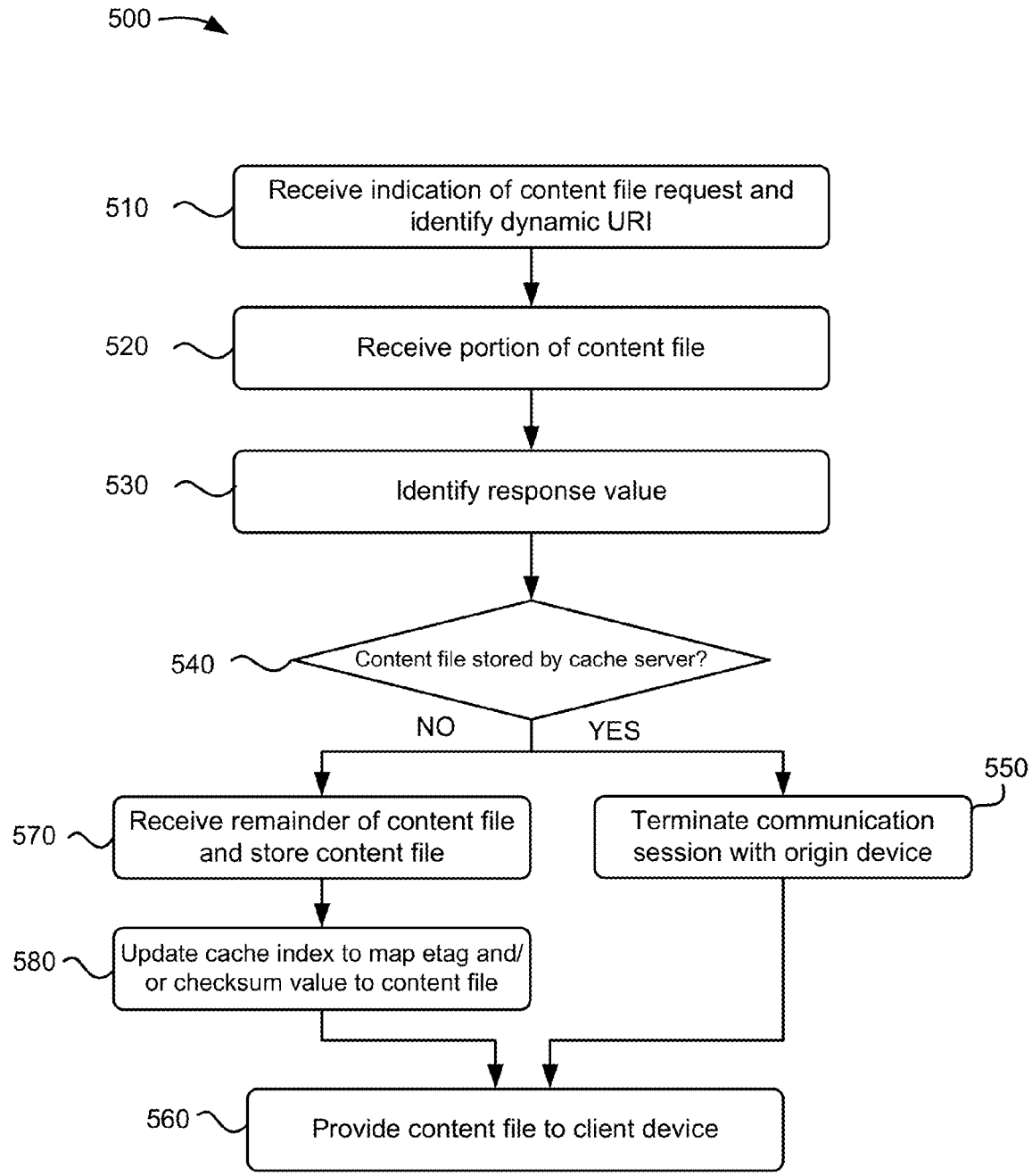
FIG. 5 illustrates a flowchart of an example process for updating a cache index for content files associated with dynamic URIs and providing the content file to a client device.

FIG. 5 illustrates a flowchart of an example process 500 for updating a cache index for content files associated with dynamic URIs and providing the content file to a client device. In one implementation, process 500 may be performed by one or more components of cache server 220. In another implementation, some or all of blocks of process 500 may be performed by one or more components of another device in environment 200 (e.g., origin device 230 or client device 210), or a group of devices including or excluding cache server 220.

As shown in FIG. 5, process 500 may include receiving an indication of a content file request and identifying a dynamic URI (block 510). For example, cache server 220 may receive the indication of the content file request from client device 210 when client device 210 requests the content file from origin device 230 using a URI. In some implementations, cache server 220 may determine that the URI is a dynamic URI based on a format of the URI, a session ID included in the URI, a hash code included in the URI, etc. For example, cache server 220 may determine the format of a dynamic URI based on information, provided by origin device 230, that identifies the format of the dynamic URI. In some implementations, cache server 220 may determine a session ID or a hash code included in the URI based on identifying a format of the session ID and/or hash code (e.g., based on a data structure, stored by cache server 220 or some other device, that identifies the formats of session IDs and/or hash codes).

In some implementations, cache server 220 may remove a portion of the URI corresponding to a dynamic portion of the URI (e.g., a portion of the URI that may differ for different requests for the same content file, such as a session ID, a hash code, etc.). Additionally, or alternatively, cache server 220 may store (e.g., in data structure 400) a static portion of the URI corresponding to a domain to identify a particular origin device 230 associated with the particular content file. In some implementations, cache server 220 may use the static portion of the URI as a cache parameter to identify a cache hit and/or a cache miss.

Process 500 may include receiving a portion of the content file (block 520). In some implementations, cache server 220 may receive the portion of the content file (e.g., from origin device 230) when client device 210 requests the content file. For example, cache server 220 may function as a front-end server to receive a content file (or a portion of the content file) on behalf of client device 210 when the content file is requested by client device 210. In some implementations, cache server 220 may establish a communication session with origin device 230 to receive the portion of the content file. In some implementations, the portion of the content file may correspond to a sample size of the content file and may have a size corresponding to information stored by sample size field 430.

Process 500 may further include identifying a response value (block 530). For example, cache server 220 may identify a response value, associated with the portion of the content file, such as an etag, a checksum value, a response header, an element of metadata, or the like. In some implementations, cache server 220 may identify an etag and/or an element of metadata based on a response header associated with the portion of the content file. For example, cache server 220 may read the etag or the element of metadata from a field of the response header, or may identify the etag or the element of metadata based on some other technique. Additionally, or alternatively, cache server 220 may determine a checksum value based on data associated with the portion of the content file. For example, as described above, cache server 220 may use a checksum algorithm (e.g., a message-digest series 5 algorithm (MD5) or some other checksum algorithm) to determine the checksum value of the portion of the content file. In some implementations, cache server 220 may identify some other cache index parameter (e.g., a domain identifying a particular origin device 230, attributes of the content file, such as a date and time that the content file was created or modified, a length of the content file, etc.) that may be used to identify whether the content file is being stored by cache server 220.

Process 500 may also include determining whether the content file is being stored by the cache server (block 540). For example, cache server 220 may look up the response value and/or a request value, (e.g., the domain of origin device 230 based on a static portion of the URI), and/or some other cache index parameter stored by data structure 400 to identify whether the content file is being stored by cache server 220. As an example, assume that cache server 220 identifies a response value, such a checksum value calculated for the portion of the content file (e.g., the value12345). Further, assume that data structure 400 stores the checksum value of 12345 and a corresponding content file. Given these assumptions, cache server 220 may determine that the content file is being stored by cache server 220 (e.g., a cache hit). In another example, assume that cache server 220 determines a checksum value of 12345 and that data structure 400 does not store the checksum value of 12345. Given these assumptions, cache server 220 may determine that the content file is not being stored by cache server 220 (e.g., a cache miss). In some implementations (e.g., when a content file request includes a session ID in a dynamic URI), cache server 220 may identify a cache hit or a cache miss based on a regular expression (regex) policy engine and based on the session ID.

In some implementations, cache server 220 may identify a cache hit or a cache miss based on a combination of one or more response values (e.g., including or excluding a checksum value) and/or one or more request values. For example, as described above, a cache index may map the content file to a combination of the one or more response values and/or one or more request values.

If, for example, cache server 220 determines that the content file is being stored (block 540—YES), process 500 may further include terminating the communication session with the origin device (block 550). For example, cache server 220 may terminate the communication session with the origin device based on determining that cache server 220 is storing the content file. In some implementations, cache server 220 may terminate the communication session to prevent additional data from being received by cache server 220 (e.g., from origin device 230), thereby reducing network traffic.

Process 500 may also include providing the content file to the client device (block 560). For example, cache server 220 may provide the content file to client device 210 from a storage device of cache server 220 (e.g., since cache server 220 stores the content file, as determined in block 540).

If, on the other hand, cache server 220 determines that the content file not being stored (block 540—NO), process 500 may further include receiving the remainder of the content file and storing the content file (block 570). For example, cache server 220 may receive the remainder of the content file from origin device 230 (e.g., via the communication session established in block 520) and may store the content file (e.g., to provide the content file to client device 210 if a subsequent request is received for the content file).

Process 500 may also include updating the cache index to map the etag and/or the checksum value to the content file (block 580). For example, cache server 220 may update information stored by data structure 400 to map the etag, the checksum value, and/or some other cache index parameter to the content file such that cache server 220 may identify the content file if a subsequent request is received for the content file.

Process 500 may further include providing the content file to the client device (block 560). For example, as described above, cache server 220 may provide the content file to client device 210 from a storage device of cache server 220. Alternatively, cache server 220 may direct or request origin device 230 to provide the content file to client device 210.

While a particular series of blocks has been described above with regard to FIG. 5, the operations, data flows, and/or the order of the blocks may be modified in other implementations. Further, non-dependent operations and/or data flows may be performed in parallel. In some implementations, blocks 570-580 may be omitted when an operator of cache server 220 selects not to store the content file (e.g., when a measure of popularity of the content file is below a particular threshold and/or based on some other factor). For example, for a cache miss, cache server 220 may terminate the communication session with origin device 230 and direct or request origin device 230 to provide the content file to client device 210. Additionally, or alternatively, blocks 520-530 may be omitted in implementations where a cache index includes request values and not response values.

Figure 6A:
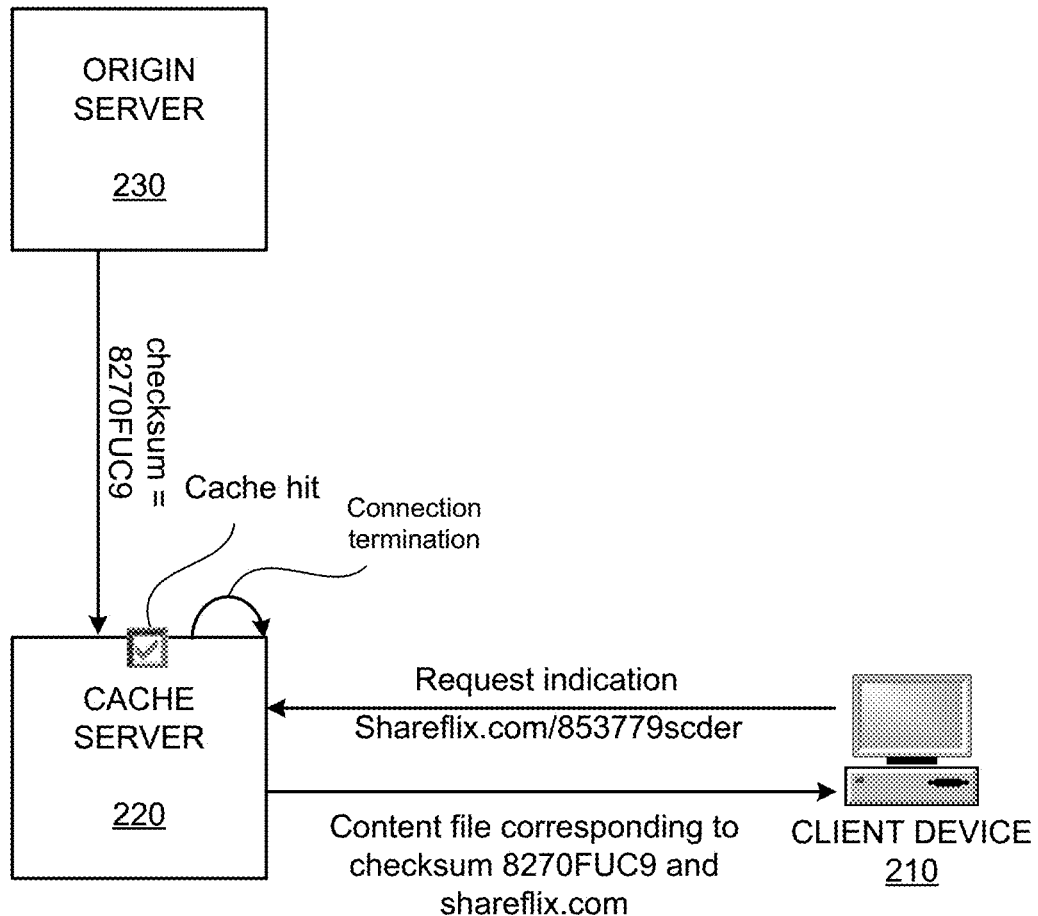
FIGS. 6A-6C illustrate example implementations as described herein.

FIG. 6A illustrates an example implementation as described herein. As shown in FIG. 6A, client device 210 may request a content file via a dynamic URI (e.g., the URI "Shareflix.com/853779scder"). As described above, cache server 220 may establish a communication session with origin device 230 and may receive a portion of the content file from origin device 230. In FIG. 6A, assume that the portion of the content file includes a response header for which checksum value is determined (e.g., the checksum value "8270FUC9"). In some implementations, cache server 220 may look up the checksum in a cache index to determine whether the content file is being stored by cache server 220. Additionally, or alternatively, cache server 220 may lookup a request value (e.g., a static portion of the URI, such as "shareflix.com"). In FIG. 6A, assume that cache server 220 determines that the checksum value and the request value is stored in the cache index (e.g., a cache hit). As shown in FIG. 6A, cache server 220 may terminate the communication session with origin device 230 and may provide the content file, corresponding to the checksum value "8270FUC9," and the request value "shareflix.com" to client device 210.

Figure 6B:
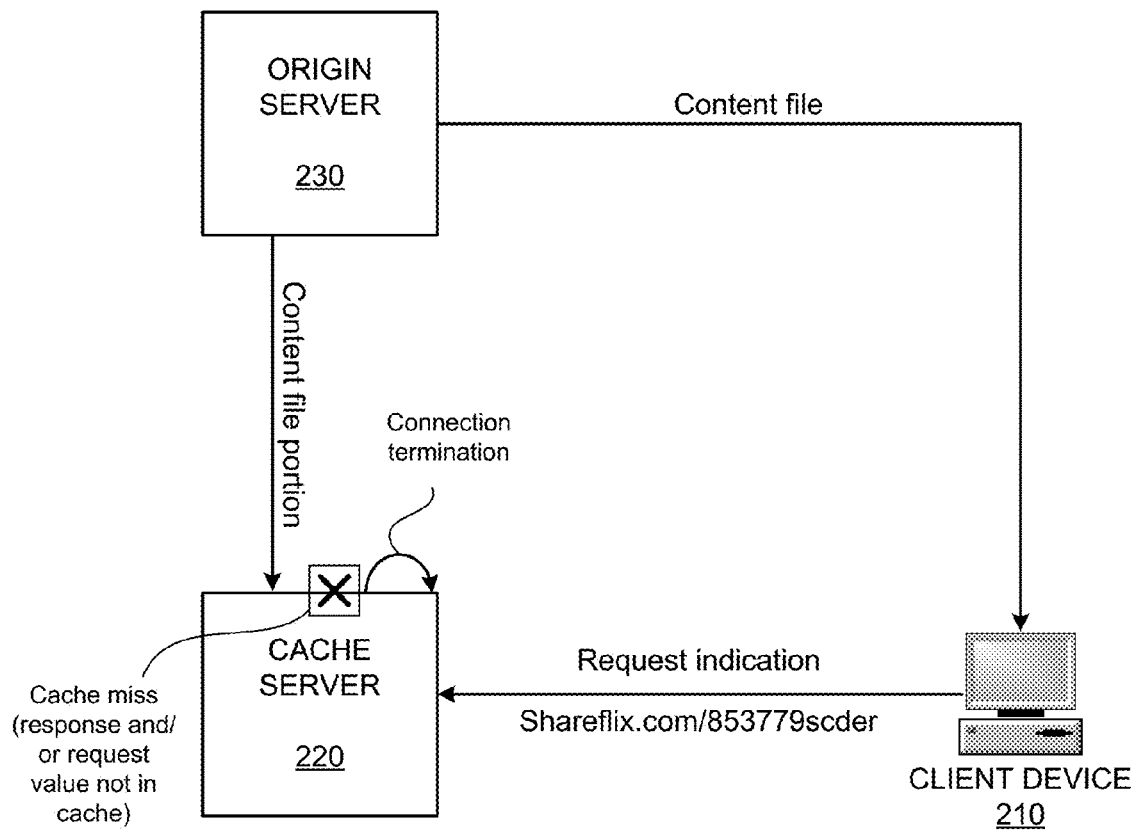

FIG. 6B illustrates an example implementation as described herein. As shown in FIG. 6B, client device 210 may request a content file via a dynamic URI (e.g., the URI "Shareflix.com/853779scder"). As described above, cache server 220 may receive a portion of the content file from origin device 230 and may determine a checksum value associated with the portion of the content file. Additionally, or alternatively, cache server 220 may identify an etag from the portion of the content file and/or elements of metadata associated with the portion of the content file. In some implementations, cache server 220 may look up the checksum value, the etag, and/or the elements of metadata associated with the portion of the content file in a cache index to determine whether the content file is being stored by cache server 220. In FIG. 6B, assume that cache server 220 determines that neither the checksum value, the etag, nor the elements of metadata associated with the portion of the content file are stored in the cache index (e.g., a cache miss). As shown in FIG. 6B, cache server 220 may terminate the connection with origin device 230 and may direct origin device 230 to provide the content file to client device 210. Alternatively, cache server 220 may receive the remaining portion of the content file, store the content file, update the cache index, and/or provide the content file to client device 210.

Figure 6C:
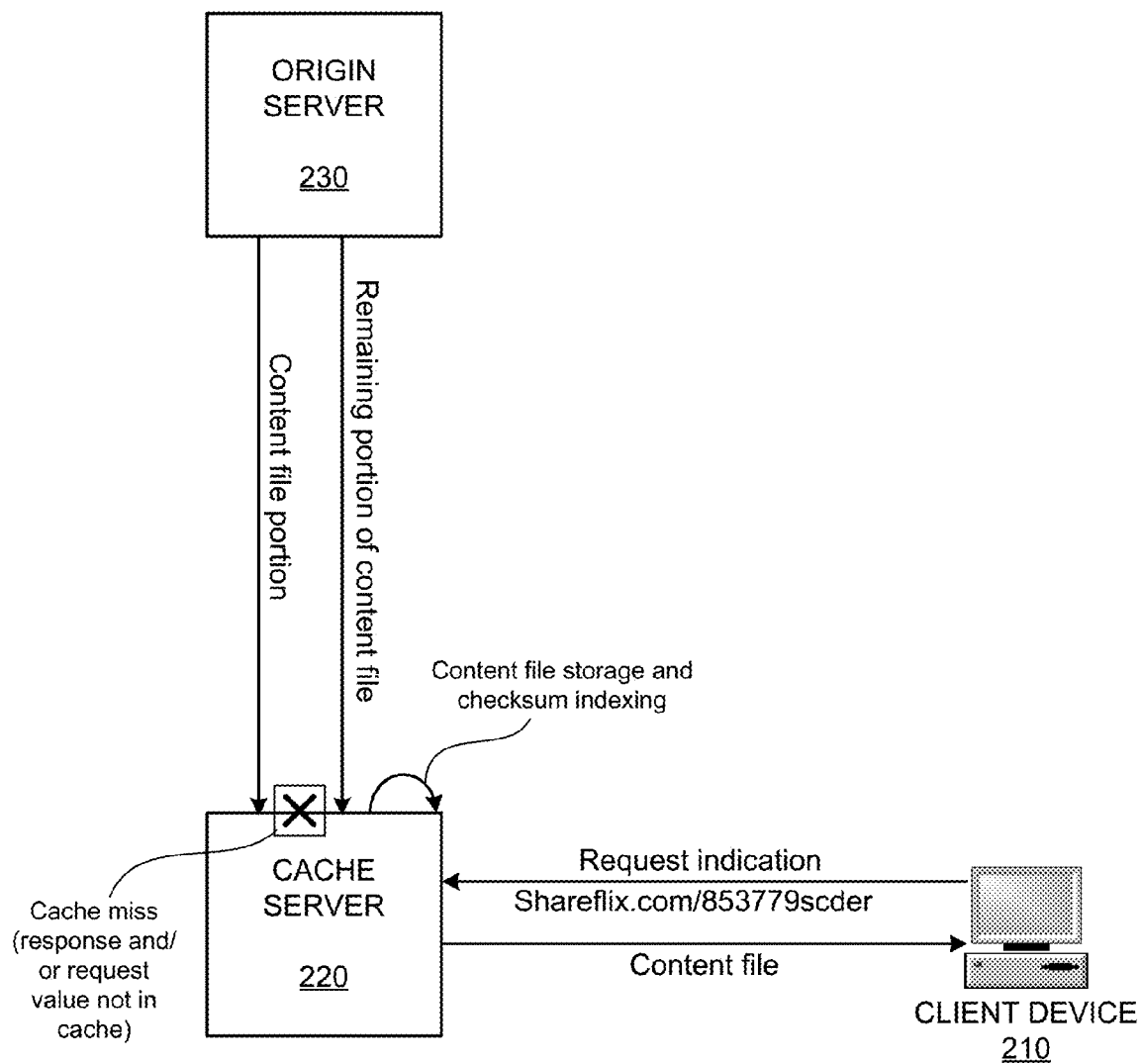

For example, referring to FIG. 6C, client device 210 may request a content file via a dynamic URI (e.g., the URI "Shareflix.com/853779scder"). In FIG. 6C, assume that cache server 220 determines that the content file is not being stored by cache server 220 (e.g., a cache miss). Given this assumption, and as shown in FIG. 6C, cache server 220 may receive the remaining portion of the content file, store the entire content file, update the cache index, and provide the content file to client device 210.

As described above, cache server 220 may prevent caching multiple instances of a particular content file associated with a dynamic URI. Further network traffic may be reduced since cache server 220 receives a portion of the content file to identify a cache index parameter (e.g., an etag, a checksum value, elements of metadata associated with the portion of the content file, or some other parameter) that uniquely identifies a content file and is used to identify a cache hit or a cache miss. Additionally, because the checksum value is based on data associated with the content file, cache server 220 may prevent caching multiple instances of the particular content file when the particular content file is stored by multiple origin devices 230. In some implementations, cache server 220 may hash multiple parameters to identify a cache hit or a cache miss (e.g., cache server 220 may hash an etag, a length of the content file, a data and time in which the content file was created or modified, etc.).

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a server and from an origin device that provides a content file to the server, information that identifies a format of a dynamic address,
      the dynamic address being separate from the information that identifies the format of the dynamic address;
   determining, by the server and based on the information that identifies the format of the dynamic address, the format of the dynamic address;
   receiving, by the server, an indication of a request for a content file when a client device requests the content file using a network address;
   determining, by the server and after receiving the indication, that the network address is the dynamic address based on the format of the dynamic address;
   determining, by the server, a static portion of the network address based on determining that the network address is the dynamic address; and
   providing, by the server, the content file to the client device based on the static portion of the network address.

2. The method of claim 1, further comprising:
   determining a session identifier included in the network address,
      where determining that the network address is the dynamic address comprises:
         determining that the network address is the dynamic address based on the format of the dynamic address and the session identifier.

3. The method of claim 1, further comprising:
   determining a hash code included in the network address,
      where determining that the network address is the dynamic address comprises:
         determining that the network address is the dynamic address based on the format of the dynamic address and the hash code.

4. The method of claim 1, further comprising:
   removing a dynamic portion of the network address based on determining that the network address is the dynamic address.

5. The method of claim 1, where the static portion of the network address corresponds to a domain of the origin device associated with the content file.

6. The method of claim 1, further comprising:
   identifying a cache hit based on the static portion of the network address,
      where providing the content file to the client device comprises:

providing the content file to the client device based on identifying the cache hit.

7. The method of claim 1, further comprising:
receiving, from the origin device, a portion of the content file when the client device requests the content file;
identifying a response value based on the portion of the content file; and
determining that the content file is stored by the server based on the response value and the static portion of the network address.

8. The method of claim 1, where the dynamic address includes at least one of:
a universal resource identifier (URI), or
an Internet Protocol (IP) address.

9. A system comprising:
one or more processors, implemented at least partially in hardware, to:
receive, from an origin device that provides a content file to a server, information that identifies a format of a dynamic address,
the dynamic address being separate from the information that identifies the format of the dynamic address;
determine, based on the information that identifies the format of the dynamic address, the format of the dynamic address;
receive an indication of a request for a content file when a client device requests the content file using a network address;
determine, after receiving the indication, that the network address is the dynamic address based on the format of the dynamic address; and
provide the content file to the client device based on determining that the network address is the dynamic address.

10. The system of claim 9,
where the one or more processors are further to:
determine a static portion of the network address based on determining that the network address is the dynamic address, and
where, when providing the content file, the one or more processors are to:
provide the content file to the client device based on the static portion of the network address.

11. The system of claim 9,
where the one or more processors are further to:
determine a response value based on a portion of the content file;
determine a request value based on determining that the network address is the dynamic address; and
determine that the content file is stored in a cache of the system based on the response value and based on the request value, and
where, when providing the content file, the one or more processors are to:
provide the content file to the client device based on determining that the content file is stored in the cache of the system.

12. The system of claim 9, where the one or more processors are further to:
terminate, based on determining that the network address is the dynamic address, a communication session with the origin device associated with the content file in a manner that prevents additional data being received from the origin device.

13. The system of claim 9,
where the one or more processors are further to:

determine that the content file is not stored in a cache of the system based on determining that the network address is the dynamic address, and
where, when providing the content file, the one or more processors are to:
provide the content file to the client device based on determining that the content file is not stored in the cache of the system.

14. The system of claim 13, where the one or more processors are further to:
receive a portion of the content file based on determining that the content file is not stored in the cache of the system; and
store the content file in the cache of the system after receiving the portion of the content file.

15. The system of claim 9, where the dynamic address includes at least one of:
a universal resource identifier (URI), or
an Internet Protocol (IP) address.

16. A non-transitory computer-readable medium storing instructions, the instructions comprising:
one or more instructions that, when executed by at least one processor, cause the at least one processor to:
receive, from an origin device that provides a content file to a server, information that identifies a format of a dynamic address,
the dynamic address being separate from the information that identifies the format of the dynamic address;
determine, based on the information that identifies the format of the dynamic address, the format of the dynamic address;
determine that a network address, associated with a request for a content file, is the dynamic address based on the format of the dynamic address;
determine a static portion of the network address based on determining that the network address is the dynamic address; and
provide the content file to a client device based on the static portion of the network address.

17. The non-transitory computer-readable medium of claim 16, where the one or more instructions to determine that the network address is the dynamic address comprises:
one or more instructions that, when executed by the at least one processor, cause the at least one processor to:
receive an indication of the request for the content file when the client device requests the content file using the network address; and
determine, after receiving the indication, that the network address is the dynamic address based on the format of the dynamic address.

18. The non-transitory computer-readable medium of claim 16,
where the instructions further comprise:
one or more instructions that, when executed by the at least one processor, cause the at least one processor to:
identify a format of a session identifier based on the information that identifies the format of the dynamic address; and
determine the session identifier in the network address based on identifying the format of the session identifier, and
where the one or more instructions to determine that the network address is the dynamic address comprise:

one or more instructions that, when executed by the at least one processor, cause the at least one processor to:
determine that the network address is the dynamic address based on the session identifier.

19. The non-transitory computer-readable medium of claim 16,
where the instructions further comprise:
one or more instructions that, when executed by the at least one processor, cause the at least one processor to:
identify a cache miss based on the static portion of the network address, and
where the one or more instructions to provide the content file comprise:
one or more instructions that, when executed by the at least one processor, cause the at least one processor to:
provide the content file to the client device based on identifying the cache miss.

20. The non-transitory computer-readable medium of claim 16, where the instructions further comprise:
one or more instructions that, when executed by the at least one processor, cause the at least one processor to:
receive, from the origin device associated with the content file, a portion of the content file when the client device requests the content file,
identify a value based on the portion of the content file, and
determine, before providing the content file, that the content file is stored by a cache server based on the value and the static portion of the network address.

\* \* \* \* \*